(12) United States Patent
Kim et al.

(10) Patent No.: US 12,522,887 B2
(45) Date of Patent: Jan. 13, 2026

(54) HIGH-STRENGTH STEEL SHEET HAVING EXCELLENT HOLE EXPANDABILITY AND METHOD FOR MANUFACTURING SAME

(71) Applicant: POSCO CO., LTD, Pohang-si (KR)

(72) Inventors: Sung-Kyu Kim, Gwangyang-si (KR); Kyoung-Rae Cho, Gwangyang-si (KR); Chang-Hyo Seo, Gwangyang-si (KR); Ki-Hyun Park, Gwangyang-si (KR); Sang-Ho Han, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 373 days.

(21) Appl. No.: 18/022,958

(22) PCT Filed: Sep. 7, 2021

(86) PCT No.: PCT/KR2021/012134
§ 371 (c)(1),
(2) Date: Feb. 23, 2023

(87) PCT Pub. No.: WO2022/050818
PCT Pub. Date: Mar. 10, 2022

(65) Prior Publication Data
US 2023/0295763 A1     Sep. 21, 2023

(30) Foreign Application Priority Data
Sep. 7, 2020 (KR) .................... 10-2020-0113858

(51) Int. Cl.
*C21D 9/46* (2006.01)
*C21D 6/00* (2006.01)
(Continued)

(52) U.S. Cl.
CPC ............ *C21D 9/46* (2013.01); *C21D 6/002* (2013.01); *C21D 6/005* (2013.01); *C21D 6/008* (2013.01);
(Continued)

(58) Field of Classification Search
CPC ...... C21D 1/19; C21D 1/22; C21D 2211/002; C21D 2211/005; C21D 2211/008;
(Continued)

(56) References Cited

U.S. PATENT DOCUMENTS 5,885,382 A     3/1999   Sakurai et al.
2008/0000555 A1  1/2008  Nonaka et al.
(Continued)

FOREIGN PATENT DOCUMENTS

CN     103080357 A     5/2013
CN     105734438 A     7/2016
(Continued)

OTHER PUBLICATIONS

Japanese Notice of Allowance—Japanese Application No. 2023-514003 issued on Nov. 12, 2024, citing CN 110129668, JP 2007-009317, WO 2011/148490, JP 2009-108343, JP 2016-510361, WO 2020/169410, and WO 2012/073538.
(Continued)

*Primary Examiner* — Nicholas A Wang
(74) *Attorney, Agent, or Firm* — CANTOR COLBURN LLP

(57) ABSTRACT

Provided is a high-strength steel sheet and a method for manufacturing same, wherein the high-strength steel sheet is a material suitable for automobile structural members and has excellent moldability, such as hole expandability, through the improvement of ductility, while having a low yield ratio and high strength.

10 Claims, 3 Drawing Sheets

(51) Int. Cl.
*C21D 8/02* (2006.01)
*C22C 38/00* (2006.01)
*C22C 38/02* (2006.01)
*C22C 38/26* (2006.01)
*C22C 38/28* (2006.01)
*C22C 38/38* (2006.01)

(52) U.S. Cl.
CPC ......... *C21D 8/0205* (2013.01); *C21D 8/0226* (2013.01); *C21D 8/0236* (2013.01); *C22C 38/002* (2013.01); *C22C 38/02* (2013.01); *C22C 38/26* (2013.01); *C22C 38/28* (2013.01); *C22C 38/38* (2013.01); *C21D 2211/002* (2013.01); *C21D 2211/005* (2013.01); *C21D 2211/008* (2013.01)

(58) Field of Classification Search
CPC ........ C21D 6/002; C21D 6/005; C21D 6/008; C21D 8/0205; C21D 8/0226; C21D 8/0236; C21D 8/0273; C21D 9/0062; C21D 9/46; C22C 38/002; C22C 38/02; C22C 38/04; C22C 38/26; C22C 38/28; C22C 38/38
See application file for complete search history.

(56) References Cited

U.S. PATENT DOCUMENTS

| | | | |
|---|---|---|---|
| 2009/0050244 A1* | 2/2009 | Nakagawa | C22C 38/14 148/602 |
| 2011/0024004 A1 | 2/2011 | Azuma et al. | |
| 2013/0160907 A1 | 6/2013 | Kawabe et al. | |
| 2013/0192724 A1 | 8/2013 | Tanaka et al. | |
| 2013/0240094 A1 | 9/2013 | Oka et al. | |
| 2015/0361519 A1 | 12/2015 | Zhu et al. | |
| 2016/0355903 A1 | 12/2016 | Kwak et al. | |
| 2019/0338403 A1 | 11/2019 | Ahn et al. | |
| 2020/0347476 A1 | 11/2020 | Ahn et al. | |
| 2022/0010401 A1 | 1/2022 | Xue et al. | |

FOREIGN PATENT DOCUMENTS

| | | |
|---|---|---|
| CN | 105861926 A | 8/2016 |
| CN | 109594020 A | 4/2019 |
| CN | 109930068 A | 6/2019 |
| CN | 110129668 A | 8/2019 |
| CN | 111235470 | 6/2020 |
| CN | 111448332 A | 7/2020 |
| CN | 111511951 A | 8/2020 |
| JP | 1992289120 | 10/1992 |
| JP | 2005264176 | 9/2005 |
| JP | 2007009317 A | 1/2007 |
| JP | 2009108343 A | 5/2009 |
| JP | 2016510361 A | 4/2016 |
| KR | 20070061859 | 6/2007 |
| KR | 101130837 | 3/2012 |
| KR | 20130002209 | 1/2013 |
| KR | 20130074503 A | 7/2013 |
| KR | 20130106142 A | 9/2013 |
| KR | 20140130258 | 11/2014 |
| KR | 20150073844 | 7/2015 |
| KR | 20150075311 | 7/2015 |
| KR | 20160078570 | 7/2016 |
| KR | 20190075589 | 7/2019 |
| WO | 2011148490 A1 | 12/2011 |
| WO | 2012073538 A1 | 6/2012 |
| WO | 2013100485 A1 | 7/2013 |
| WO | 2016135794 | 9/2016 |
| WO | 2019092468 A1 | 5/2019 |
| WO | 2020169410 A1 | 8/2020 |

OTHER PUBLICATIONS

Chinese Office Action—Chinese Application No. 202180054949.8 issued on Aug. 22, 2024, citing CN109594020A, CN111448332A, CN103080357A, CN105734438A, CN111511951A, US2008/0000555A1, KR2016-0078570A, US2011/0024004A1, and KR2013-0106142A.
International Search Report—PCT/KR2021/012134 dated Dec. 3, 2021.
European Search Report—European Application No. 21864773.3 issued on Jun. 23, 2025, citing WO 2020/169410 A1, KR 10-2013-0074503 A, KR 10-2016-0078570 A, CN 105861926 A, and WO 2019/092468 A1.
Chinese Notice of Allowance—Chinese Application No. 202180054949.8 issued on Mar. 31, 2025, citing CN 109930068 and U.S. Pat. No. 5885382.

\* cited by examiner (a)          (b)

ROLLING DIRECTION

ASPECT RATIO b:a ized with a pickling state without performing cold rolling, so it may be difficult to ensure a high-strength steel sheet having excellent surface quality required in recent years.

HIGH-STRENGTH STEEL SHEET HAVING EXCELLENT HOLE EXPANDABILITY AND METHOD FOR MANUFACTURING SAME

TECHNICAL FIELD

The present disclosure relates to a steel suitable for an automotive material, and more particularly, to a high-strength steel sheet having excellent hole expandability and a method for manufacturing the same.

BACKGROUND ART

In recent years, the use of a high-strength steel is demanded for improving fuel efficiency and durability, due to various environmental regulations and energy use regulations.

In particular, as regulations for impact stability of automobiles have expanded, a high-strength steel having excellent strength is being employed as a material of structural members such as a member, seat rail, and pillar for improving impact resistance of a car body.

Since automotive parts have a complicated shape depending on their stability and design, and are manufactured by molding with a press mold, they require to have a high level of moldability together with high strength.

As the strength of steel is high, the steel is favorable to energy absorption, but generally, when the strength is increased, elongation is decreased to reduce molding processability. Besides, when yield strength is excessively high, introduction of a material into a mold during molding is decreased to deteriorate moldability.

In addition, as automotive parts have a plurality of molding areas in which a hole is processed and then expands, hole expandability is required for smooth molding, but high-strength steel sheet has low hole expandability to cause defects such as cracks during molding. As such, when hole expandability is poor, cracks may occur in a hole molding part upon automobile collision to easily break the parts, so that the safety of passengers may be endangered.

Meanwhile, high-strength steel sheet used as an automotive material includes, representatively, a dual phase steel (DP steel), a transformation induced plasticity steel (TRIP steel), a complex phase steel (CP steel), a ferrite-bainite steel (FB steel), and the like.

Since a DP steel which is an ultra-high strength steel has a low yield ratio of about 0.5 to 0.6, it is easy to process, and has a second highest elongation after a TRIP steel. Thus, it is mainly applied to a door outer, a seat rail, a seat belt, a suspension, an arm, a wheel disc, and the like.

Since a TRIP steel has a yield ratio in a range of 0.57 to 0.67, it is characterized by having excellent moldability (high ductility), and is suitable for parts requiring high moldability such as a member, a roof, a seat belt, and a bumper rail.

A CP steel is applied to a side panel, an underbody reinforcement, and the like by a high elongation and bending processability together with a low yield ratio, and a FB steel has excellent hole expandability and is mainly applied to a suspension lower arm, a wheel disc, and the like.

Thereamong, a DP steel is formed of ferrite having excellent ductility and a hard phase having high strength (martensite phase, bainite phase), and a trace amount of residual austenite may exist therein. The DP steel as such has low yield strength and high tensile strength to have a low yield ratio (YR), and has excellent characteristics such as a high processing curing rate, high ductility, continuous yield behavior, aging resistance at room temperature, and bake hardenability. In addition, when the fraction and the shape (form) of the bainite phase in the structure are controlled, the steel may be manufactured as a high-strength steel having high hole expandability.

However, in order to secure an ultra-high strength of a tensile strength of 980 MPa or more, the fraction of a hard phase such as a martensite phase which is favorable to strength improvement should be increased, and in this case, yield strength is increased to cause defects such as cracks during press molding.

In general, a DP steel for an automobile is manufactured into a final product by manufacturing a slab by steelmaking and soft casting processes, subjecting the slab to [heating—rough rolling—finish hot rolling] to obtain a hot rolled coil, and then performing an annealing process.

Here, an annealing process is a process performed mainly in the manufacture of a cold rolled steel sheet, and the cold rolled steel sheet is manufactured by pickling a hot rolled coil to remove a surface scale, performing cold rolling to a certain reduction rate at room temperature, and then performing an annealing process, and, if necessary, an additional skin pass rolling process.

Since a cold rolled steel sheet (cold rolled material) obtained by cold rolling is in a very hardened state itself and is unsuitable for manufacturing parts requiring processability, it may be softened by a heat treatment in a continuous annealing line as a flow-up process to improve processability.

As an example, in the annealing process, a steel sheet (cold rolled material) is heated to about 650 to 850° C. in a heating furnace and the temperature is maintained for a certain amount of time, thereby lowering hardness and improving processability through recrystallization and phase transformation phenomena.

A steel sheet which is not subjected to the annealing process has a high hardness, in particular, a high surface hardness and lacks processability, while a steel sheet subjected to an annealing process has a recrystallization structure, thereby having lowered hardness, yield point, and tensile strength to promote improvement of processability.

As a representative method of lowering the yield strength of a DP steel, ferrite is completely recrystallized in a heating process during continuous annealing to be manufactured into an equiaxed crystal form, so that austenite is produced and grows in a follow-up process to be the equiaxed crystal form, and thus, it is favorable for forming a small-sized and uniform austenite phase.

A continuous annealing process is, as shown in FIG. 1, performed by passing through [heating section—soaking section—slow cooling section—rapid cooling section—overaging section] in an annealing furnace, in which a fine ferrite phase is formed by sufficient recrystallization in the heating section, then a small and uniform austenite phase is formed from a fine ferrite phase in the soaking section, and then a ferrite phase is recrystallized while forming fine bainite and martensite phases from the austenite during cooling.

Meanwhile, as a conventional technology for improving processability of a high-strength steel, Patent Document 1 suggests a plan for a refined structure, and specifically, discloses a method of dispersing fine precipitates copper particles of 1 to 100 nm in the structure for a composite structure steel sheet having a martensite phase as a main body. However, since the technology requires addition of 2-5% of Cu for obtaining good fine precipitation phase particles, red shortness due to a large amount of Cu may occur, and manufacturing costs are excessively increased.

Patent Document 2 discloses a high-strength steel sheet which has a structure including ferrite as a matrix structure and 2 to 10% by area of pearlite, and is due to precipitation strengthening and crystal grain refinement by adding a carbonitride forming element (e.g., Ti and the like). The technology has a merit of easily achieving high strength at low manufacturing cost, but since a recrystallization temperature rises rapidly by microprecipitation, it was found that heating to a significantly high temperature is needed during continuous annealing for securing high ductility by sufficient recrystallization. In addition, a conventional precipitation strengthening steel which is strengthened by precipitating a carbonitride in a ferrite matrix has limitation in obtaining high strength of 600 MPa or more.

Patent Document 3 discloses a technology of continuously annealing a steel material containing 0.18% or more of carbon, water-cooling the steel material to room temperature, and overaging the steel material to a temperature of 120 to 300° C. for 1 to 15 minutes, thereby securing 80 to 97% of a martensite volume ratio. The technology is favorable to improvement of yield strength, but the shape quality of a coil is poor due to a temperature deviation in a width direction and a length direction of a steel during water cooling, resulting in poor material, deteriorated workability, and the like depending on parts during processing such as roll forming.

Considering the conventional technologies described above, in order to improve moldability such as hole expandability of a high-strength steel, development of a plan which may lower a yield strength and improve ductility is required.

(Patent Document 1) Japanese Patent Laid-Open Publication No. 2005-264176

(Patent Document 2) Korean Patent Laid-Open Publication No. 2015-0073844

(Patent Document 3) Japanese Patent Laid-Open Publication No. 1992-289120

DISCLOSURE

Technical Problem

An aspect of the present disclosure is to provide a high-strength steel sheet which has excellent moldability such as hole expandability by improving ductility while having a low yield ratio and high strength, as a material suitable for automobile structural members and the like, and a method for manufacturing the same.

An object of the present disclosure is not limited to the above description. The object of the present disclosure will be understood from the entire content of the present specification, and a person skilled in the art to which the present disclosure pertains will understand an additional object of the present disclosure without difficulty.

Technical Solution

According to an aspect of the present disclosure, a high-strength steel sheet having excellent hole expandability includes, by weight: 0.05 to 0.15% of carbon (C), 0.5% or less of silicon (Si), 2.0 to 3.0% of manganese (Mn), 0.1% or less (excluding 0%) of titanium (Ti), 0.1% or less (excluding 0%) of niobium (Nb), 1.5% or less (excluding 0%) of chromium (Cr), 0.1% or less of phosphorus (P), and 0.01% or less of sulfur (S), with a balance of Fe and unavoidable impurities, wherein a microstructure is consisting of, by area fraction, 35 to 60% of ferrite and 40 to 50% of bainite, with a balance of martensite and residual austenite, and an average aspect ratio (long diameter:short diameter) of the bainite phase is 1.5 to 2.3:1.

According to another aspect of the present disclosure, a method for manufacturing a high-strength steel sheet having excellent hole expandability includes: heating a steel slab having the alloy composition described above; finish hot rolling the heated slab to an outlet temperature of Ar3 or higher and 1000° C. or lower to manufacture a hot rolled steel sheet; winding the hot rolled steel sheet at a temperature within a range of 400 to 700° C.; after the winding, cooling the steel sheet to room temperature; after the cooling, cold rolling the steel sheet at a reduction rate of 40 to 70% to manufacture a cold rolled steel sheet; continuously annealing the cold rolled steel sheet; after the continuous annealing, performing first cooling at a temperature within a range of 650 to 700° C.; and after the first cooling, performing second cooling at a temperature within a range of 300 to 580° C., wherein the continuous annealing is performed in equipment equipped with a heating section, a soaking section, and a cooling section, and a heating section end temperature is higher than a soaking section end temperature by 10° C. or more.

Advantageous Effects

As set forth above, according to an exemplary embodiment in the present disclosure, a steel sheet having high strength but excellent hole expandability to have improved moldability.

As such, since the steel sheet having improved moldability may prevent processing defects such as cracks or wrinkles during press molding, it may be suitably applied to parts for a structure requiring processing to a complicated shape, and the like. Furthermore, it is also effective for manufacturing a material having improved crashworthiness so that in the case that an automobile to which the parts are applied crashes, defects such as cracks are not formed well.

BEST MODE FOR INVENTION

Figure 1:
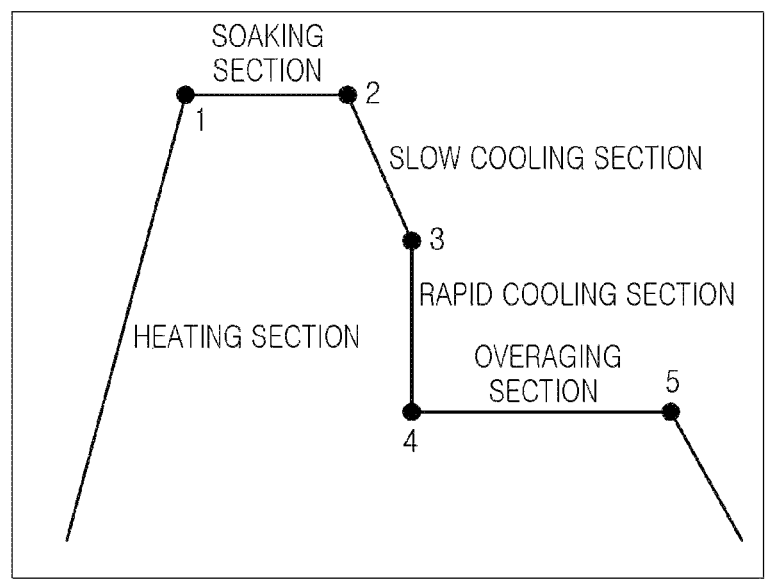
FIG. 1 schematically illustrates a heat treatment diagram of a common continuous annealing process (CAL).
Figure 2:
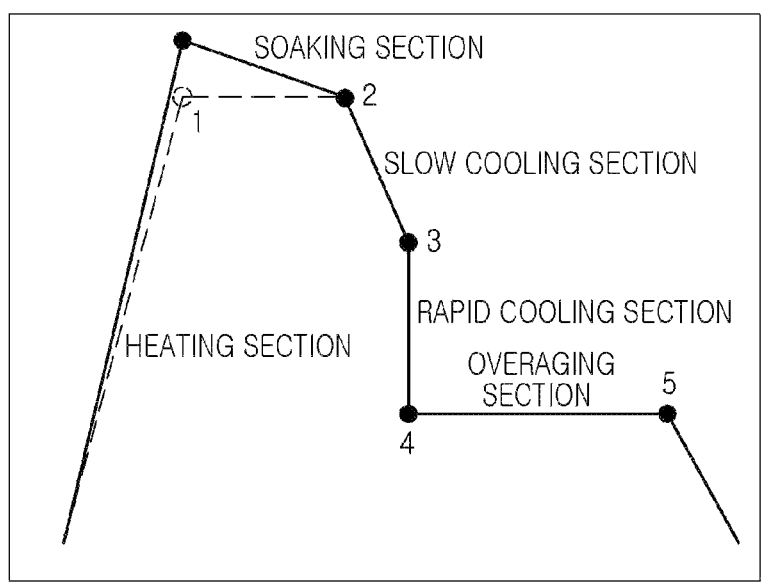
FIG. 2 schematically illustrates a heat treatment diagram of a continuous annealing process (CAL) according to an aspect of the present disclosure, which is shown with the diagram (gray line) of FIG. 1.

The inventors of the present disclosure conducted intensive research in order to develop a material having a moldability level which may be suitably used in parts and the like requiring processing to a complicated shape among automotive materials.

In particular, the present inventors confirmed that the goal may be achieved by inducing sufficient recrystallization of a soft phase affecting the ductility of a steel, and refining a hard phase favorable to strength securing and controlling a crystal grain shape, thereby completing the present disclosure.

Hereinafter, the present disclosure will be described in detail.

A high-strength steel sheet having excellent hole expandability according to an aspect of the present disclosure may include, by weight: 0.05 to 0.15% of carbon (C), 0.5% or less of silicon (Si), 2.0 to 3.0% of manganese (Mn), 0.1% or less (excluding 0%) of titanium (Ti), 0.1% or less (excluding 0%) of niobium (Nb), 1.5% or less (excluding 0%) of chromium (Cr), 0.1% or less of phosphorus (P), and 0.01% or less of sulfur (S).

Hereinafter, the reason that the alloy composition of the steel plate provided in the present disclosure is limited as described above will be described in detail.

Meanwhile, unless otherwise particularly stated in the present disclosure, the content of each element is by weight and the ratios of the structure is by area.

Carbon (C): 0.05 to 0.15%

Carbon (C) is an important element which is added for solid solution strengthening, and is bonded to a precipitation element to form a fine precipitate, thereby contributing to strength improvement of steel.

When the content of C is more than 0.15%, hardenability is increased to form martensite during cooling in the manufacture of steel, thereby excessively increasing strength, while causing a decrease in elongation. In addition, weldability is poor, so that weld defects may occur in processing into parts. Meanwhile, when the content of C is less than 0.05%, it is difficult to secure a target level of strength.

Therefore, C may be included in an amount of 0.05 to 0.15%. More favorably, it may be included in an amount of 0.06% or more and 0.13% or less.

Silicon (Si): 0.5% or less

Silicon (Si) is a ferrite stabilizing element, and promotes ferrite transformation to be favorable to securing a target level of ferrite fraction. In addition, it has good solid solution strengthening ability to be effective to increase strength of ferrite, and is an element useful for securing strength while not decreasing ductility.

When the content of Si is more than 0.5%, the solid solution strengthening effect is excessive so that ductility is rather decreased, and surface scale defects are caused to adversely affect plated surface quality. In addition, formation treatment properties are deteriorated.

Therefore, Si may be included in an amount of 0.5% or less, and 0% may be excluded. More favorably, it may be included in an amount of 0.1% or more.

Manganese (Mn): 2.0 to 3.0%

Manganese (Mn) is an element which precipitates sulfur (S) in steel as MnS to prevent hot shortness by production of FeS, and is favorable to solid solution strengthening of steel.

When the content of Mn is less than 2.0%, the effects described above may not be obtained, and it is difficult to secure a target level of strength. However, when the content is more than 3.0%, problems in weldability, hot rolling, and the like are likely to occur, and also, martensite is more easily formed by an increase in hardenability, so that ductility may be decreased. In addition, a Mn-band (Mn oxide band) is excessively formed in the structure to increase the risk of defects such as processing cracks. Further, a Mn oxide is eluted on the surface during annealing to greatly deteriorate plating properties.

Therefore, Mn may be included in an amount of 2.0 to 3.0%, and more favorably at 2.2 to 2.8%.

Titanium (Ti): 0.1% or less (excluding 0%)

Titanium (Ti) is an element forming a microcarbide, and contributes to securing yield strength and tensile strength. In addition, Ti precipitates N in steel as TiN to suppress the formation of AlN by Al which is unavoidably present in steel, and thus, reduces the possibility of cracks during continuous casting.

When the content of Ti is more than 0.1%, a coarse carbide is precipitated, and strength and an elongation may be decreased by a decreased carbon amount in steel. In addition, nozzle clogging may occur during continuous casting, and manufacturing costs may be increased.

Therefore, Ti may be included in an amount of 0.1% or less, and 0% may be excluded.

Niobium (Nb): 0.1% or less (excluding 0%)

Niobium (Nb) is segregated at an austenite grain boundary, and suppresses coarsening of austenite crystal grains during an annealing heat treatment and forms a fine carbide to contribute to strength improvement.

When the content of Nb is more than 0.1%, a coarse carbide is precipitated, strength and an elongation may be decreased by a decreased carbon amount in steel, and manufacturing costs may be increased. Therefore, Nb may be included in an amount of 0.1% or less, and 0% may be excluded.

Chromium (Cr): 1.5% or less (excluding 0%)

Chromium (Cr) is an element facilitating the formation of a bainite phase, and is an element which forms a fine carbide while suppressing the formation of a martensite phase during an annealing heat treatment, thereby contributing to strength improvement.

When the content of Cr is more than 1.5%, a bainite phase is excessively formed to decrease an elongation, and when a carbide is formed at a grain boundary, strength and the elongation may be deteriorated. In addition, manufacturing costs may be increased.

Therefore, Cr may be included in an amount of 1.5% or less, and 0% may be excluded.

Phosphorus (P): 0.1% or less

Phosphorus (P) is a substitutional element having the greatest solid solution strengthening effect, and is an element which improves in-plane anisotropy and is favorable to strength securing without significantly reducing moldability. However, when P is excessively added, a possibility of brittle fraction occurrence is greatly increased, so that a possibility of sheet fracture of a slab during hot rolling is increased and plated surface properties are deteriorated.

Therefore, in the present disclosure, the content of P may be controlled to 0.1% or less, and 0% may be excluded considering an avoidably added level.

Sulfur (S): 0.01% or less

Sulfur (S) is an element which is unavoidably added as an impurity element in steel, and deteriorates ductility, and thus, it is preferred to manage the content as low as possible. In particular, S has a problem of increasing a possibility of red shortness occurrence, it is preferred to control the content of 0.01% or less. However, considering the unavoidably added level during the manufacturing process, 0% may be excluded.

The remaining component of the present disclosure is iron (Fe). However, since in the common manufacturing process, unintended impurities may be inevitably incorporated from raw materials or the surrounding environment, the component may not be excluded. Since these impurities are known to any person skilled in the common manufacturing process, the entire contents thereof are not particularly mentioned in the present specification.

The steel sheet of the present disclosure having the alloy composition may be formed of ferrite, and a bainite phase and a martensite phase as a hard phase, as a microstructure.

Specifically, the steel sheet of the present disclosure includes, by area fraction, 35 to 60% of a ferrite phase and 40 to 50% of a bainite phase. For the remainder, a martensite phase and a trace amount of residual austenite phase may be included.

When the fraction of the bainite phase is excessively high, the fraction of a soft phase is lowered, so that a target level of moldability may not be secured, but when the fraction is less than 40%, hole expandability may be poor.

Meanwhile, the fraction of the residual austenite phase is favorably not more than 3%, and even at 0%, it is not difficult to secure the intended physical properties.

In the steel sheet of the present disclosure, the shape of the bainite phase is controlled in including the bainite phase in the fraction range described above, thereby securing the targeted moldability more favorably.

Specifically, it is preferred that the bainite phase may have an average aspect ratio (long diameter:short diameter) of 1.5 to 2.3:1.

When the average aspect ratio of the bainite is more than 2.3, deformation and stress are locally concentrated on bainite distributed in a rolling direction to deteriorate ductility. It is not necessarily to particularly limit the lower limit of the average aspect ratio of the bainite phase, but considering the shape of the bainite phase by processing, the lower limit of the average aspect ratio may be set to 1.5 or more.

Figure 5:
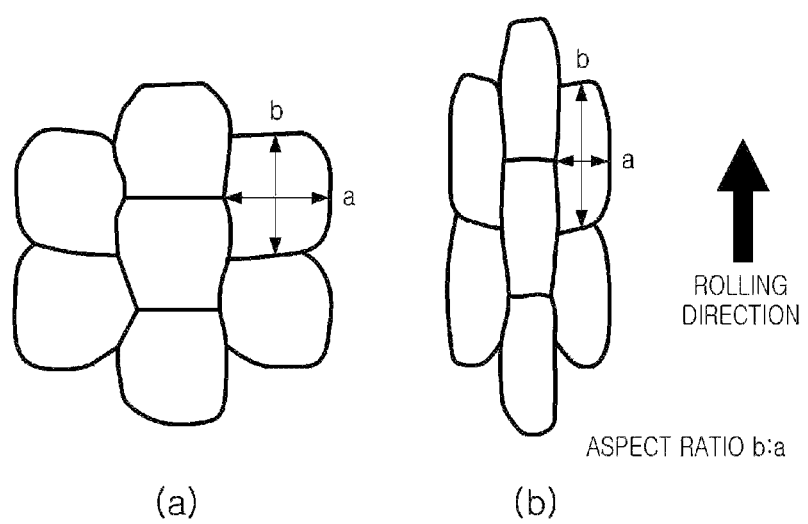
FIG. 5 is a schematic diagram of an aspect ratio of bainite grains in an exemplary embodiment in the present disclosure.

The aspect ratio in the present disclosure refers to a vertical (long diameter) and horizontal (short diameter) ratio (long diameter:short diameter) of a crystal grain size to a rolling direction, and for example, is as shown in FIG. 5. In FIG. 5, (a) is a schematic diagram showing the crystal grain size of bainite having an aspect ratio of about 1:1, and (b) is a schematic diagram showing the crystal grain size of bainite having an aspect ratio at a level limited in the present invention. In addition, the aspect ratio value in the present disclosure refers to an average aspect ratio value of bainite crystal grains.

Meanwhile, the fraction of a martensite phase among the phases forming the hard phase is not specifically limited, but the martensite phase may be included up to 15% by area, preferably 15% by area or less (excluding 0%) in the total structure fraction for securing ultra-high strength of a tensile strength of 980 MPa or more.

The steel sheet of the present disclosure having the microstructure described above has a tensile strength of 980 MPa or more, a yield strength of 680 MPa or less, an elongation (total elongation) of 13% or more, and a yield ratio of 0.7 or less, and may have characteristics of high ductility and a low yield ratio with high strength.

Besides, the steel sheet may have an effect of excellent hole expandability by having a hole expansion ratio (HER) of 30% or more.

Hereinafter, the method for manufacturing a high-strength steel sheet having excellent hole expandability according to another aspect of the present disclosure will be described in detail.

In briefly, in the present disclosure, a target steel sheet may be manufactured by the processes of [steel slab heating—hot rolling—winding—cold rolling—continuous annealing], and hereinafter, each process will be described in detail.

[Steel Slab Heating]

First, a steel slab satisfying the alloy composition described above may be prepared, and then heated.

The present process is performed for performing a subsequent hot rolling process well and sufficiently obtaining the target physical properties of the steel sheet. In the present disclosure, the conditions of the heating process are not particularly limited, and may be common conditions. As an example, the heating process may be performed at a temperature within a range of 1100 to 1300° C.

[Hot Rolling]

The steel slab heated as described above may be hot rolled to manufacture a hot-rolled steel sheet, and herein finish hot rolling may be performed at an outlet temperature of Ar3 or higher and 1000° C. or lower.

When an outlet temperature is lower than Ar3 in the finish hot rolling, hot deformation resistance is rapidly increased, and the top, tail, and edge portions of a hot rolled coil become a single phase area to increase in-plane anisotropy, so that moldability may be deteriorated. Meanwhile, when the temperature is higher than 1000° C., a rolling load is relatively decreased, so that it is favorable to productivity, but a thick oxide scale may occur.

More specifically, the finish hot rolling may be performed at a temperature within a range of 760 to 940° C.

[Winding]

The hot-rolled steel sheet manufactured as described above may be wound to a coil shape.

The winding may be performed at a temperature within a range of 400 to 700° C. When the winding temperature is lower than 400° C., an excessive strength increase of the hot rolled steel sheet is caused due to excessive formation of martensite or bainite, and problems such as poor shape due to a load during subsequent cold rolling may be caused. However, when the winding temperature is higher than 700° C., a surface scale is increased to deteriorate pickling properties.

[Cooling]

It is preferred that the wound hot rolled steel sheet is cooled to room temperature at an average cooling rate of 0.1° C./s or less (excluding 0° C./s). Here, the wound hot rolled steel sheet may be cooled after being subjected to processes such as transfer and stacking, and the process before cooling is not limited thereto.

As such, the wound hot rolled steel sheet is cooled at a constant speed, thereby obtaining a hot rolled steel sheet in which a carbide which is a nucleation site of austenite is finely dispersed.

[Cold Rolling]

The hot rolled steel sheet wound as described above is cold rolled to manufacture a cold rolled steel sheet.

Here, the cold rolling may be performed at a cold reduction rate of 40 to 70%. When the cold reduction rate is less than 40%, recrystallization driving force is weakened, so that it is difficult to obtain good recrystallized grains, but when the cold reduction rate is more than 70%, cracks are very likely to occur in the edge portion of the steel sheet, and a rolling load may be rapidly increased.

In the present disclosure, a hot rolled steel sheet may be pickled before the cold rolling, and the pickling process may be performed by a common method.

[Continuous Annealing]

It is preferred that the cold rolled steel sheet manufactured as described above is continuously annealed. The continuous annealing treatment may be performed in a continuous annealing line (CAL), as an example.

Usually, the continuous annealing line (CAL) may be formed of [heating section—soaking section—cooling section (slow cooling section and rapid cooling section)—overaging section], and after the cold rolled steel sheet is charged into the continuous annealing line as such, the steel sheet is heated to a certain temperature in the heating section, and after a target temperature is reached, the steel sheet is maintained in the soaking section for a certain period of time.

In the present disclosure, in order to obtain fine bainite and martensite phases together with ferrite recrystallized as a final microstructure, a plan to apply sufficient pressurized heat to the steel sheet in the heating area formed of [heating section—soaking e section] during continuous annealing was intended to be built.

Specifically, in a common continuous annealing process, the final temperature of the heating section and the temperature of the soaking section are controlled to be the same, but in the present disclosure, the temperatures of the heating section and the soaking section are independently controlled.

That is to say, in a common continuous annealing process, the start temperature and the end temperature of the soaking section are controlled to be the same, which means that the end temperature of the heating section and the start temperature of the soaking section are the same.

Unlike this, in the present disclosure, the temperature of the heating section is controlled to be higher than the temperature of the soaking section, thereby further promoting the recrystallization of ferrite in the heating section, which leads to formation of fine ferrite, and thus, austenite formed at a ferrite grain boundary may be also formed to be small and uniform.

Preferably, in the present disclosure, the heating section end temperature is controlled to be higher by 10° C. or more than the soaking section end temperature, and more preferably, the following Relation may be satisfied:

10≤heat section end temperature—soaking section end temperature (° C.)≤40 [Relation Formula]

That is, in the present disclosure, the heating section end temperature is controlled to be higher than the soaking section end temperature, but when the temperature difference is less than 10° C., ferrite recrystallization is delayed and it is difficult to obtain a fine and uniform austenite phase, but when the temperature difference is more than 40° C., a subsequent cooling process is not sufficiently performed due to the excessive temperature difference, and thus, a coarse bainite or coarse martensite phase may be formed in the final structure.

In the present disclosure, the end temperature of the heating section may be 790 to 830° C., and when the temperature is lower than 790° C., heat input for recrystallization may not be sufficiently applied, but when the temperature is higher than 830° C., productivity is deteriorated and an austenite phase is excessively formed, so that the fraction of a hard phase may be greatly increased after subsequent cooling to deteriorate the ductility of steel.

In addition, the soaking section end temperature may be 760 to 790° C., and when the temperature is lower than 760° C., excessive cooling is required at the heating section end temperature, which is economically unfavorable, and thermal quantity for recrystallization may not be sufficient. However, when the temperature is higher than 790° C., the fraction of austenite is excessive, so that the fraction of a hard phase may be excessive during cooling to decrease moldability.

Meanwhile, in the present disclosure, a temperature difference between the heating section end temperature and the soaking section end temperature may be implemented from blocking of heating means from the point at which the heating section process is completed to the point at which the soaking section process is completed, and as an example, furnace cooling may be performed in the corresponding area. However, the present disclosure is not limited thereto.

[Stepwise Cooling]

The cold rolled steel sheet subjected to continuous annealing as described above was cooled, thereby forming a target structure, and here, it is preferred to perform cooling stepwise.

In the present disclosure, the stepwise cooling may be formed of first cooling—second cooling, and specifically, first cooling may be performed at a temperature within a range of 650 to 700° C. at an average cooling rate of 1 to 10° C./s after the continuous annealing, and second cooling may be performed at a temperature within a range of 300 to 580° C. at an average cooling rate of 5 to 50° C./s.

Here, the first cooling is performed more slowly than the second cooling, thereby suppressing sheet shape defects due to a rapid temperature drop during the second cooling which is a relatively rapid cooling area.

When the end temperature in the first cooling is lower than 650° C., the diffusion activity of carbon is low due to the too low temperature, so that a carbon centration in ferrite is increased, but as the carbon temperature in austenite is decreased, so that the fraction of a hard phase is excessive to increase a yield ratio, resulting in a higher tendency to crack occurrence during processing. In addition, the cooling rates in the soaking section and the slow cooling section are excessively high, so that the shape of the sheet is non-uniform.

When the end temperature is higher than 700° C., an excessively high cooling rate is required in the subsequent cooling (second cooling). In addition, when the average cooling rate in the first cooling is more than 10° C./s, carbon diffusion may not sufficiently occur. Meanwhile, considering the productivity, the first cooling process may be performed at an average cooling rate of 1° C./s or more.

As described above, after completing the first cooling, rapid cooling (second cooling) may be performed at a cooling rate at or above a certain level. Here, when the second cooling end temperature is lower than 300° C., a cooling deviation in a width direction and a length direction of the steel sheet occur, so that a sheet shape may be deteriorated, but when the temperature is higher than 580° C., a hard phase may not be sufficiently secured, so that the strength may be lowered. In addition, the average cooling rate in the second cooling is less than 5° C./s, the fraction of the hard phase may be excessive, but when the average cooling rate is more than 50° C./s, the hard phase may be rather insufficient.

Meanwhile, if necessary, when the stepwise cooling is completed, an overaging treatment may be performed.

The overaging treatment is a process of maintaining for a certain period of time after the second cooling end temperature, and a uniform heat treatment in a width direction and a length direction of the coil is performed, thereby improving shape quality. To this end, the overaging treatment may be performed for 200 to 800 seconds.

Since the overaging treatment may be performed immediately after the end of the second cooling, the temperature may be the same as the second cooling end temperature or may be performed within the second cooling end temperature range.

The high-strength steel sheet of the present disclosure manufactured as described above is formed of a hard phase and a soft phase as a microstructure, and in particular, ferrite recrystallization is extremely increased by an optimized annealing process, thereby having a structure in which bainite and martensite phases which are hard phases are uniformly distributed in a finally recrystallized ferrite matrix.

Thus, the steel sheet of the present disclosure may secure excellent hole expandability and moldability by securing a low yield ratio and high ductility, even with a high strength of a tensile strength of 980 MPa or more.

Hereinafter, the present disclosure will be described in detail byway of the examples. However, the description of the examples is only for illustrating implementation of the present disclosure, and the present disclosure is not limited by the description of the examples. The reason is that the right scope of the present disclosure is determined by the matters described in the claims and reasonably inferred therefrom.

Mode for Invention

Examples

Steel slabs having the alloy composition shown in the following Table 1 were manufactured, and each steel slab was heated at 1200° C. for 1 hour and was finish hot rolled at a finish rolling temperature of 880 to 920° C., thereby manufacturing hot rolled steel sheets. Thereafter, each hot rolled steel sheet was wound at 650° C., and then cooled to room temperature at a cooling rate of 0.1° C./s. Thereafter, the wound hot rolled steel sheets were cold rolled to a reduction rate of 50% to manufacture cold rolled steel sheets. Each of the cold rolled steel sheets was continuously annealed under the temperature conditions shown in the following Table 2, was cooled stepwise (first-second), and was overaged at 360° C. for 520 seconds to manufacture a final steel sheet.

At this time, first cooling was performed at an average cooling rate of 3° C./s and second cooling was performed at an average cooling rate of 20° C./s, in the stepwise cooling.

The microstructure of each steel sheet manufactured as described above was observed, the mechanical properties and the plating properties thereof were evaluated, and the results are shown in the following Table 3.

At this time, a tensile test for each specimen was performed at a strain rate of 0.01/s after collecting a tensile specimen of a JIS No. 5 size in a vertical direction to a rolling direction.

Meanwhile, a hole expanding ratio (HER) is a test of measuring an ultimate ability to withstand deformation when large deformation more than the uniform elongation of a steel sheet is applied in processing of expanding and elongating a punched hole or a cross section. After measuring a diameter value (df) at the point where a crack occurs during hole expansion, a HER value may be calculated (see the following formula), and this was performed in accordance with an ISO 16630 standard method.

$$HER = (Df - Do)/Do - 100(\%)$$

(Do: initial punched hole diameter, Df: inner hole diameter after fracture)

Further, among the structural phases, bainite was observed at 5000× magnification by SEM after nital etching. At this time, the aspect ratio (long diameter:short diameter) of bainite particles was measured by viewing a direction elongated from the crystal grain shape of the observed bainite phase as a longitudinal direction, and the fraction was measured.

Each fraction of other phases and the like was measured using SEM and an image analyzer after nital etching.

TABLE 1

| Steel No. | Alloy composition (wt %) | | | | | | | |
|---|---|---|---|---|---|---|---|---|
| | C | Si | Mn | P | S | Cr | Ti | Nb |
| 1 | 0.07 | 0.18 | 2.4 | 0.010 | 0.0052 | 0.98 | 0.015 | 0.08 |
| 2 | 0.09 | 0.27 | 2.8 | 0.011 | 0.0040 | 1.02 | 0.042 | 0.04 |

TABLE 2

| | Continuous annealing conditions (° C.) | | | | | |
|---|---|---|---|---|---|---|
| Steel No. | Heating section end temperature | soaking section end temperature | Temperature difference | First cooling end temperature | Second cooling end temperature | Classification |
| 1 | 750 | 750 | 0 | 650 | 450 | Comparative Example 1 |
| 1 | 770 | 770 | 0 | 650 | 450 | Comparative Example 2 |
| 1 | 790 | 790 | 0 | 650 | 450 | Comparative Example 3 |
| 1 | 800 | 790 | 10 | 650 | 450 | Inventive Example 1 |
| 1 | 810 | 790 | 20 | 650 | 450 | Inventive Example 2 |

TABLE 2-continued

| Steel No. | Heating section end temperature | soaking section end temperature | Temperature difference | First cooling end temperature | Second cooling end temperature | Classification |
|---|---|---|---|---|---|---|
| | Continuous annealing conditions (° C.) | | | | | |
| 1 | 820 | 790 | 30 | 650 | 450 | Inventive Example 3 |
| 1 | 830 | 790 | 40 | 650 | 450 | Inventive Example 4 |
| 2 | 750 | 750 | 0 | 650 | 450 | Comparative Example 4 |
| 2 | 770 | 770 | 0 | 650 | 450 | Comparative Example 5 |
| 2 | 790 | 790 | 0 | 650 | 450 | Comparative Example 6 |
| 2 | 800 | 790 | 10 | 650 | 450 | Inventive Example 5 |
| 2 | 810 | 790 | 20 | 650 | 450 | Inventive Example 6 |
| 2 | 820 | 790 | 30 | 650 | 450 | Inventive Example 7 |
| 1 | 790 | 770 | 20 | 650 | 450 | Inventive Example 8 |
| 2 | 790 | 770 | 20 | 650 | 450 | Inventive Example 9 |
| 2 | 790 | 810 | −20 | 650 | 450 | Comparative Example 7 |

TABLE 3

| | Microstructure | | | | Mechanical properties | | | | |
|---|---|---|---|---|---|---|---|---|---|
| | $F^1$ | $M^2$ | $B^3$ | | | $TS^5$ | Yield | | |
| Classification | % by area | % by area | % by area | Aspect ratio | $YS^4$ (MPa) | % by area | ratio (YS/TS) | $E1^6$ (%) | HER (%) |
| Comparative Example 1 | 56.1 | 3.8 | 40.1 | 2.7:1 | 597.7 | 919.5 | 0.65 | 7.2 | 15.8 |
| Comparative Example 2 | 54.1 | 4.9 | 41 | 2.65:1 | 622.6 | 970.6 | 0.64 | 12.2 | 16.7 |
| Comparative Example 3 | 42 | 11 | 47 | 2.44:1 | 690.2 | 1046.5 | 0.66 | 14.5 | 34.5 |
| Inventive Example 1 | 43 | 13.2 | 43.8 | 2.1:1 | 649.4 | 1067.2 | 0.61 | 14.6 | 35.4 |
| Inventive Example 2 | 42.9 | 12.9 | 44.2 | 1.8:1 | 647.2 | 1062.6 | 0.61 | 14.9 | 36.1 |
| Inventive Example 3 | 43.1 | 11.7 | 45.2 | 1.7:1 | 627 | 1033 | 0.61 | 15.5 | 35.8 |
| Inventive Example 4 | 44.1 | 13.8 | 42.1 | 1.5:1 | 678.4 | 1045.2 | 0.65 | 11.4 | 38.9 |
| Comparative Example 4 | 54.1 | 5.7 | 40.2 | 2.75:1 | 477.7 | 934.8 | 0.51 | 7.2 | 14.6 |
| Comparative Example 5 | 53.8 | 4.4 | 41.8 | 2.7:1 | 622.6 | 979.4 | 0.64 | 12.2 | 15.9 |
| Comparative Example 6 | 41.6 | 10.1 | 48.3 | 2.41:1 | 689.8 | 1058.4 | 0.65 | 13.2 | 33.3 |

TABLE 3-continued

| | Microstructure | | | | Mechanical properties | | | | |
|---|---|---|---|---|---|---|---|---|---|
| | F[1] | M[2] | B[3] | | TS[5] | | Yield | | |
| Classification | % by area | % by area | % by area | Aspect ratio | YS[4] (MPa) | % by area | ratio (YS/TS) | E1[6] (%) | HER (%) |
| Inventive Example 5 | 39.8 | 12.7 | 47.5 | 2.25:1 | 650.6 | 1070 | 0.61 | 14.6 | 35.2 |
| Inventive Example 6 | 40.3 | 11.5 | 48.2 | 1.94:1 | 647.3 | 1052.7 | 0.61 | 14.8 | 35.9 |
| Inventive Example 7 | 41.5 | 9.4 | 49.1 | 1.85:1 | 654.7 | 1085.5 | 0.60 | 13.7 | 35.7 |
| Inventive Example 8 | 55.1 | 1.7 | 43.2 | 2.1:1 | 615.4 | |1006.1 | 0.61 | 15.8 | 36.7 |
| Inventive Example 9 | 56.3 | 0.2 | 43.5 | 2.3:1 | 638.7 | 1016.1 | 0.63 | 15.3 | 35.4 |
| Comparative Example 7 | 40.8 | 8.9 | 50.3 | 2.4:1 | 679.1 | 1059.1 | 0.64 | 13.7 | 22.3 |

[1]Ferrite phase,
[2]Martensite phase,
[3]Bainite phase,
[4]Yield strength,
[5]Tensile strength,
[6]Total elongation.

As shown in Tables 1 to 3, in Inventive Examples 1 to 9 in which the steel alloy composition and the manufacturing conditions, in particular, a continuous annealing process satisfied all of the suggestions in the present disclosure, a microstructure to be intended was formed, and thus, the steel sheets had high strength and excellent elongation to have excellent hole expandability, and it was confirmed therefrom that a target level of moldability may be secured.

However, in Comparative Examples 1 to 6 in which the continuous annealing process in a steel making process was performed the same as before, that is, the heating section end temperature and the soaking section end temperature were applied identically, the bainite phase was excessively elongated, so that the aspect ratio (long diameter:short diameter) of more than 2.3:1 was shown, and the physical properties to be desired in the present disclosure were not satisfied. Among them, Comparative Examples 1, 2, 4, and 5 having a lower annealing temperature had a low elongation and poor hole expandability, and Comparative Examples 3 and 6 had a yield strength more than the target level.

Meanwhile, in Comparative Example 7 in which the soaking section end temperature was excessively higher than the heating section end temperature during the continuous annealing in the steel making process, more than 50% by area of the bainite phase was formed, so that securing strength was favorable, but hole expandability was poor.

Figure 3:
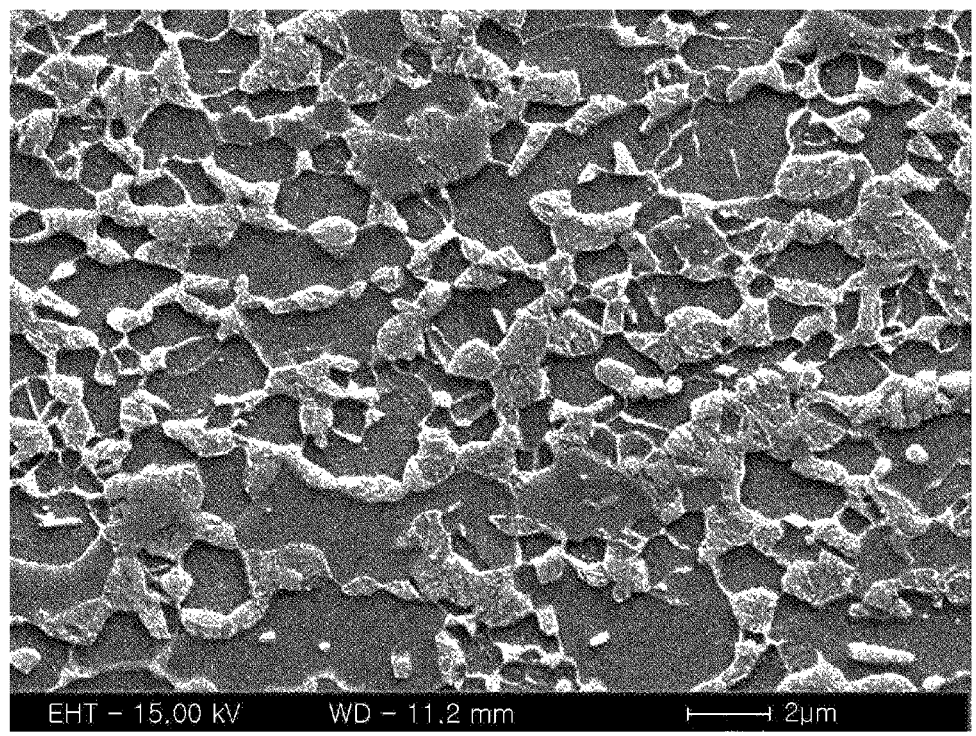
FIG. 3 is an image of a microstructure of an inventive example according to an exemplary embodiment in the present disclosure.
Figure 4:
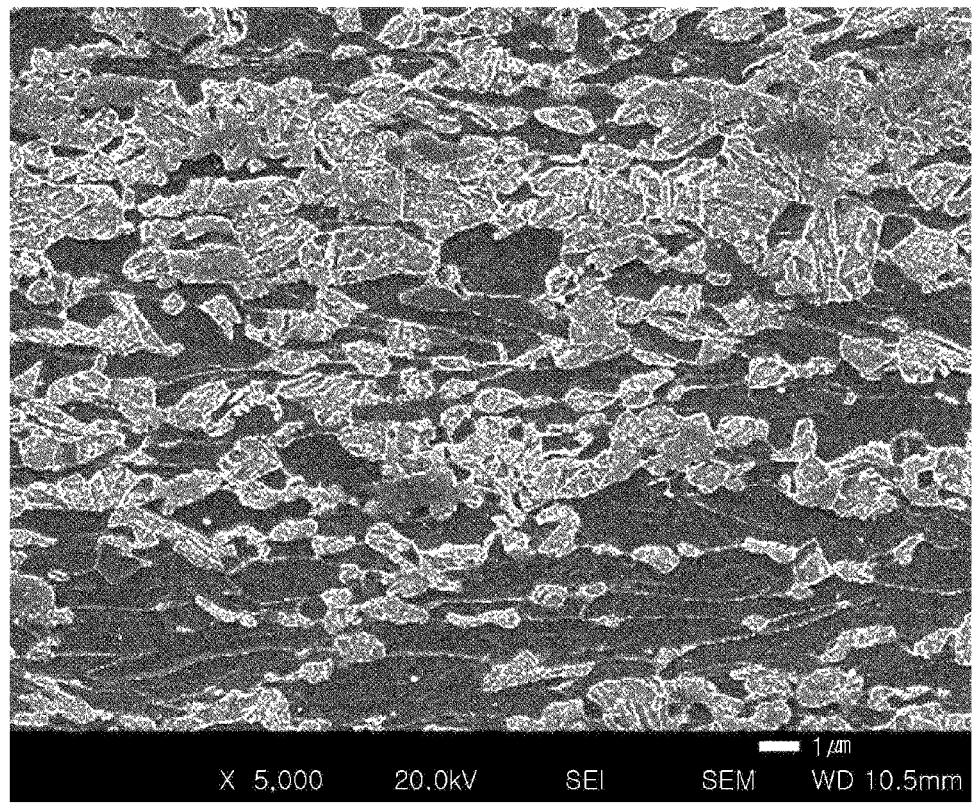
FIG. 4 is an image of microstructure of a comparative example according to an exemplary embodiment in the present disclosure.

FIG. 3 is an image of the microstructure of Inventive Example 4, and FIG. 4 is a photograph of the microstructure of Comparative Example 6.

It was confirmed in Inventive Example 4 that a fine bainite phase and a certain fraction of martensite phase were formed in a relatively sufficient fraction of recrystallized ferrite matrix.

However, it was confirmed in Comparative Example 6 that ferrite was elongated in a rolling direction, so that bainite was formed in the same form, and since the bainite fraction was increased, the yield strength and the yield ratio were high, so that moldability was poor.

The invention claimed is:

1. A comprising, by weight: 0.05 to 0.15% of carbon (C), 0.5% or less of silicon (Si), 2.0 to 3.0% of manganese (Mn), 0.1% or less (excluding 0%) of titanium (Ti), 0.1% or less (excluding 0%) of niobium (Nb), 1.5% or less (excluding 0%) of chromium (Cr), 0.1% or less of phosphorus (P), and 0.01% or less of sulfur(S), with a balance of Fe and unavoidable impurities, wherein a microstructure is formed of, by area fraction, 35 to 60% of ferrite and 40 to 50% of bainite, with a balance of martensite and residual austenite, and an average aspect ratio (long diameter:short diameter) of the bainite phase is 1.5 to 2.3:1.

2. The steel sheet of claim 1, wherein the martensite is included in an amount of an area fraction of 15% or less (excluding 0%).

3. The steel sheet of claim 1, wherein the steel sheet has a tensile strength of 980 MPa or more, a yield strength of 680 MPa or less, and an elongation of 13% or more.

4. The steel sheet of claim 1, wherein the steel sheet has a yield ratio of 0.7 or less and HER of 30% or more.

5. A method for manufacturing a steel sheet, the method comprising:

heating a steel slab including, by weight: 0.05 to 0.15% of carbon (C), 0.5% or less of silicon (Si), 2.0 to 3.0% of manganese (Mn), 0.1% or less (excluding 0%) of titanium (Ti), 0.1% or less (excluding 0%) of niobium (Nb), 1.5% or less (excluding 0%) of chromium, 0.1% or less of phosphorus (P), and 0.01% or less of sulfur (S), with a balance of Fe and unavoidable impurities, finish hot rolling the heated slab to an outlet temperature of Ar3 or higher and 1000° C. or lower to manufacture a hot rolled steel sheet;

winding the hot rolled steel sheet at a temperature within a range of 400 to 700° C. to manufacture a wound steel sheet;

cooling the wound steel sheet to room temperature to manufacture a cooled steel sheet;

cold rolling the cooled steel sheet to a reduction rate of 40 to 70% to manufacture a cold rolled steel sheet;

continuously annealing the cold rolled steel sheet to manufacture an annealed steel sheet;

first cooling the annealed steel sheet at a temperature within a range of 650 to 700° C. to manufacture a first cooled steel sheet; and second cooling the first cooled steel sheet at a temperature within a range of 300 to 580° C. to manufacture a second cooled steel sheet, wherein the continuous annealing is performed in equipment equipped with a heating section, a soaking section, and a cooling section, and a heating section end temperature is higher than a soaking section end temperature by 10° C. or more.

6. The method of claim 5, wherein the heating section end temperature and the soaking section end temperatures satisfy the following relation:

10≤heat section end temperature−soaking section end temperature (° C.)≤40.   [Relation Formula]

7. The method of claim 5, wherein the heating section end temperature is 790 to 830° C. and the soaking section end temperature is 760 to 790° C.

8. The method of claim 5, wherein the cooling after the winding is performed at an average cooling rate of 0.1° C./s or less (excluding 0° C./s).

9. The method of claim 5,
wherein the first cooling is performed at an average cooling rate of 1 to 10° C./s, and
the second cooling is performed at an average cooling rate of 5 to 50° C./s.

10. The method of claim 5, further comprising: after the second cooling, performing an overaging treatment,
wherein the overaging treatment is performed for 200 to 800 seconds.

* * * * *